US012511337B2

(12) United States Patent
Saitwal et al.

(10) Patent No.: US 12,511,337 B2
(45) Date of Patent: Dec. 30, 2025

(54) SYSTEMS AND METHODS FOR REINFORCING SEARCH ENGINE BEHAVIOR USING FEDERATED LEARNING

(71) Applicant: Wesco Distribution, Inc., Pittsburgh, PA (US)

(72) Inventors: Kishor Saitwal, Sugar Land, TX (US); Shashi Dande, Spring, TX (US); Raja Vikram Raj Pandya, Katy, TX (US); Avinash Wesley, New Caney, TX (US); Rafael Da Matta Navarro, Houston, TX (US); Merwan Mereby, Baton Rouge, LA (US); Ashok Bajaj, Katy, TX (US); Akash Khurana, Houston, TX (US)

(73) Assignee: Wesco Distribution, Inc., Pittsburgh, PA (US)

( * ) Notice: Subject to any disclaimer, the term of this patent is extended or adjusted under 35 U.S.C. 154(b) by 16 days.

(21) Appl. No.: 18/219,530

(22) Filed: Jul. 7, 2023

(65) Prior Publication Data

US 2025/0013703 A1 Jan. 9, 2025

(51) Int. Cl.
*G06F 16/9536* (2019.01)
*G06F 16/9532* (2019.01)
*G06F 16/954* (2019.01)

(52) U.S. Cl.
CPC ...... *G06F 16/9536* (2019.01); *G06F 16/9532* (2019.01); *G06F 16/954* (2019.01)

(58) Field of Classification Search
None
See application file for complete search history.

(56) References Cited

U.S. PATENT DOCUMENTS

| | | | | |
|---|---|---|---|---|
| 2005/0187975 | A1* | 8/2005 | Yamane | G06F 16/3347 707/E17.08 |
| 2007/0233671 | A1* | 10/2007 | Oztekin | G06F 16/9535 707/999.005 |
| 2008/0071713 | A1* | 3/2008 | Tung | H04B 1/1615 706/21 |
| 2011/0010371 | A1* | 1/2011 | Xu | G06F 16/24578 707/E17.109 |
| 2019/0266288 | A1* | 8/2019 | Shukla | G06F 16/9535 |
| 2021/0034677 | A1* | 2/2021 | Lee | G06F 16/3334 |
| 2023/0195801 | A1* | 6/2023 | Yang | G06F 16/31 707/722 |
| 2023/0315766 | A1* | 10/2023 | Cho | G06F 16/3338 707/722 |

* cited by examiner

*Primary Examiner* — Yu Zhao

(74) *Attorney, Agent, or Firm* — K&L Gates LLP

(57) ABSTRACT

Systems, methods, and computer-readable storage media for reinforcing and modifying the search engine behavior using aspects of federated learning. A system can receive, from a plurality of first users at a computer system, a query for a product, and generate a vector representation of the query. The system can then execute a search of an embedding space for the vector representation, resulting in a first ranked list of at least one product, wherein the embedding space comprises vectorized product representations for a plurality of products, and wherein the first ranked list is ranked in order of similarity of the vectorized product representations to the vector representation of the query. As feedback is received from multiple users, and the query is received again, the system can generate a second ranked list which is the first ranked list modified by the feedback of the plurality of first users.

18 Claims, 6 Drawing Sheets

SYSTEMS AND METHODS FOR REINFORCING SEARCH ENGINE BEHAVIOR USING FEDERATED LEARNING

BACKGROUND

1. Technical Field

The present disclosure relates to search engines, and more specifically to reinforcing and modifying the search engine behavior using aspects of federated learning.

2. Introduction

Search engines are computer algorithms which search for and identify products in a database that correspond to keywords or characters specified by a user.

SUMMARY

Additional features and advantages of the disclosure will be set forth in the description that follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media which provide a technical solution to the technical problem described. A method for performing the concepts disclosed herein can include: receiving, from a user at a computer system at a first time, a query for a product; generating, via at least one processor of the computer system, a vector representation of the query; executing, via the at least one processor, a search of an embedding space for the vector representation, resulting in a first ranked list of at least one product, wherein the embedding space comprises vectorized product representations for a plurality of products, and wherein the first ranked list is ranked in order of similarity of the vectorized product representations to the vector representation of the query; presenting, to the user via the computer system, the first ranked list; receiving, from the user, feedback from the user regarding the first ranked list; receiving, from the user at a second time after the first time and after the receiving of the feedback, the query for the product; generating, via the at least one processor using the vector representation of the query, a second ranked list, wherein the second ranked list is the first ranked list modified by the feedback.

A method for performing the concepts disclosed herein can include: receiving, from a plurality of first users at a computer system, a query for a product; generating, via at least one processor of the computer system, a vector representation of the query; executing, via the at least one processor, a search of an embedding space for the vector representation, resulting in a first ranked list of at least one product, wherein the embedding space comprises vectorized product representations for a plurality of products, and wherein the first ranked list is ranked in order of similarity of the vectorized product representations to the vector representation of the query; presenting, to the plurality of first users via the computer system, the first ranked list; receiving, from the plurality of first users, feedback from the plurality of first users regarding the first ranked list, wherein the feedback is received in parallel; receiving, from a second user after the receiving of the feedback, the query for the product; generating, via the at least one processor using the vector representation of the query, a second ranked list, wherein the second ranked list is the first ranked list modified by the feedback of the plurality of first users.

A system configured to perform the concepts disclosed herein can include: at least one processor; and a non-transitory computer-readable storage medium having instructions stored which, when executed by the at least one processor, cause the at least one processor to perform operations comprising: receiving, from a user at a first time, a query for a product; generating a vector representation of the query; executing a search of an embedding space for the vector representation, resulting in a first ranked list of at least one product, wherein the embedding space comprises vectorized product representations for a plurality of products, and wherein the first ranked list is ranked in order of similarity of the vectorized product representations to the vector representation of the query; presenting, to the user, the first ranked list; receiving, from the user, feedback from the user regarding the first ranked list; receiving, from the user at a second time after the first time and after the receiving of the feedback, the query for the product; generating, using the vector representation of the query, a second ranked list, wherein the second ranked list is the first ranked list modified by the feedback.

A system configured to perform the concepts disclosed herein can include: at least one processor; and a non-transitory computer-readable storage medium having instructions stored which, when executed by the at least one processor, cause the at least one processor to perform operations comprising: receiving, from a plurality of first users, a query for a product; generating a vector representation of the query; executing a search of an embedding space for the vector representation, resulting in a first ranked list of at least one product, wherein the embedding space comprises vectorized product representations for a plurality of products, and wherein the first ranked list is ranked in order of similarity of the vectorized product representations to the vector representation of the query; presenting, to the plurality of first users, the first ranked list; receiving, from the plurality of first users, feedback from the first user regarding the first ranked list, wherein the feedback is received in parallel; receiving, from a second user after the receiving of the feedback, the query for the product; generating, using the vector representation of the query, a second ranked list, wherein the second ranked list is the first ranked list modified by the feedback.

A non-transitory computer-readable storage medium configured as disclosed herein can have instructions stored which, when executed by at least one processor, cause the at least one processor to perform operations which include: receiving, from a user at a first time, a query for a product; generating a vector representation of the query; executing a search of an embedding space for the vector representation, resulting in a first ranked list of at least one product, wherein the embedding space comprises vectorized product representations for a plurality of products, and wherein the first ranked list is ranked in order of similarity of the vectorized product representations to the vector representation of the query; presenting, to the user, the first ranked list; receiving, from the user, feedback from the user regarding the first ranked list; receiving, from the user at a second time after the first time and after the receiving of the feedback, the query for the product; generating, using the vector representation of the query, a second ranked list, wherein the second ranked list is the first ranked list modified by the feedback.

A non-transitory computer-readable storage medium configured as disclosed herein can have instructions stored which, when executed by at least one processor, cause the at least one processor to perform operations which include: receiving, from a first user at a first time, a query for a product; generating a vector representation of the query; executing a search of an embedding space for the vector representation, resulting in a first ranked list of at least one product, wherein the embedding space comprises vectorized product representations for a plurality of products, and wherein the first ranked list is ranked in order of similarity of the vectorized product representations to the vector representation of the query; presenting, to the first user, the first ranked list; receiving, from the first user, feedback from the first user regarding the first ranked list; receiving, from a second user at a second time after the first time and after the receiving of the feedback, the query for the product; generating, using the vector representation of the query, a second ranked list, wherein the second ranked list is the first ranked list modified by the feedback.

DETAILED DESCRIPTION

Figure 1:
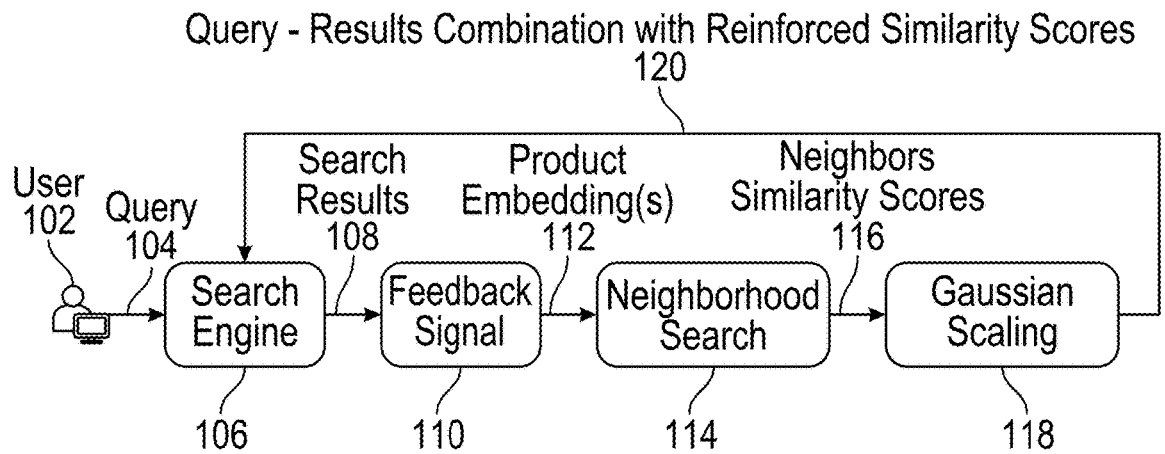
FIG. 1 illustrates an example architecture for a query search pipeline.

Various embodiments of the disclosure are described in detail below. While specific implementations are described, this is done for illustration purposes only. Other components and configurations may be used without parting from the spirit and scope of the disclosure.

Systems configured as disclosed herein provide a federated learning-based search engine which leverages user feedback on past searches to learn user preferences and expectations to improve future search relevancy, both individually (user level) as well as globally across the entire user spectrum. This user-centric search uses reinforcement learning of positive and negative signals for a given query. These positive and negative signals are used to improve similarity scores of relevant products, such that the same query will provide better results in subsequent iterations.

Federated learning (also known as collaborative learning) is a machine learning technique that trains an algorithm using inputs from multiple sources. For example, under federated learning, multiple people can remotely provide inputs, feedback, or data to collaboratively train a single deep learning model, thereby iteratively improving the resulting algorithm, much like a team presentation or report. The underlying principle of federated learning to train the algorithm through decentralized feedback and inputs-can be used by systems configured as disclosed herein.

Reinforcement learning can be used with or without federated learning, such that as users provide feedback (e.g., positive feedback indicating that they like or approve of a suggested query result, or negative feedback indicating that none of the query results were what was sought after) the system can modify the search results which will be provided the next time that query is made.

For example, when a query (e.g., query "A") is a new query for a given user (i.e., this is the first time this particular user has made this particular search), the system can execute a search which returns a list of items (query-results) which the system calculates are sought after by the user. The user can then provide feedback (more specifically, a "reinforcement signal") on the query-results, and that feedback can be saved by the system. When the user makes that same query A again in the future, the previously saved feedback can be used by the system to provide tailored search results, with the result being that each time that query A is made, the system can use the stored feedback to provide more accurate results to the user. Thus, each time the user executes a query (e.g., query A), receives the query-results, and provides feedback on those query-results, the subsequent query-results for that query will be more refined/tailored.

If the system is configured to also provide federated learning, the feedback from other users with respect to query-results can be used to collaboratively train the system for the associated query. For example, when a query is a new query for a given user (i.e., this is the first time this particular user has made this particular search), the system executes a search for when others have made that same query, and more specifically the feedback provided by those other users. Because the search relies on the previous search results/feedback of others, the search is a "federated search." In such cases, the query-results and associated feedback combinations from different users can be averaged together (i.e., a "federated average") to create a first set of query-results for the new user. Additional data which can be used to create the new user's query-results can include information such as search frequency of that query (e.g., how often that search is made), characteristics of the user (e.g., job title, experience. The new user, upon receiving their tailored query-results, can then provide feedback (more specifically, a "reinforcement signal") on the query-results, and that feedback can be saved by the system. In future iterations, that feedback can then be used by the system to provide tailored search results for when the user, or other users, make that same query again. Thus, each time any of the users executes a query (e.g., query A), receives the query-results, and provides feedback on those query-results, the subsequent query-results provided to any of the system users for that query will be more refined/tailored. Moreover, the feedback received using federated learning can be serial/sequential (e.g., user A provides feedback on a query, then user B makes the same query and the system modifies query results based on user A's feedback) or in parallel (e.g., users A and B provide feedback at the same time, and the system incorporates that feedback before providing updated query results to user C).

The federated reinforcement learning system disclosed herein can use a word embedding space, where word embeddings are representations of individual words transformed into real-valued vectors ("vector representations") when the context or meaning of the word cannot be expressed as a single number. These vector representations can, for example, have multiple dimensions (e.g., fifty, one hundred twenty, etc.), each dimension representing a different characteristic of the underlying word. The individual vector representations can be stored within an embedding space (also known as a vector space) having the same number of dimensions. An embedding space with the words stored within it is known as a "word embedding space. Each word has a specific location within the word embedding space determined by the strength of the vectors representing the word, and the distance between the word locations can be calculated to determine their relative similarity. For example, vector representations of "cup" and "mug" have vector representations which result in a higher similarity score than "cup" and "cat."

Transformation of the words into embeddings can be done using any known word embedding model (i.e., an algorithm) for natural language processing. A common word embedding model is WORD2VEC, which uses a neural network model to learn word associations from a large corpus of text. When executed, each distinct word is represented by a particular list of numbers called a vector. The vectors are chosen such that they capture the semantic, syntactic, and other qualities of words. As such, a mathematical function (e.g., cosine similarity) can indicate the level of semantic similarity between the words represented by those vectors. Other non-limiting examples of algorithms which can be used to generate the word embeddings can include GloVE by STANFORD and FastText by FACEBOOK.

In addition to using semantic and syntactic qualities of words to generate the vectors for each word, systems configured as described herein can use definitions or descriptions of those words to generate the vectors forming each word embedding. For example, the system can use product descriptions of the items. The product descriptions can, for example, be retrieved from a database, scrapped from a website, or provided by a manufacturer.

Preferably, the user of a system configured as disclosed herein searches a database for an item, schematic, product, or other article/unit, by entering a 'search query', which is a brief text description of the target product. The system converts the search query into a query vector representation using a word embedding model, then the search algorithm uses the query vector representation to match the query against multiple relevant products as results. For example, when a user executes a query using the disclosed system, the system can embed the query, resulting in a vector representation of the query. Using that query vector representation, the system can search the embedding space of stored vector representations ("embeddings") of products/items which are similar to the query vector representation. This "neighborhood" search can, for example, be done by measuring a Euclidean distance (or other distance measurement, such as a cosine distance) between the query vector representation and the vector representations of the products. These distances can become the basis for similarity scores for the searched-for products. Based on the similarity scores, the system can present a list of results to the query. The user may then select a product from the presented list of results or reject the results entirely, resulting in feedback on the query results.

When the system is first initialized, the search results provided to the user in response to the query can be based solely on these distance-based similarity scores. However, after the system is initialized, the system can use a combination of: (1) feedback (from the user or from other users, depending on system configuration), and (2) the distance between the vector representations of products and the query vector representation, to provide results. For example, when the system is first initialized the search results displayed to the user for an initial query can be the products which have the top ranked similarity scores (e.g., the top four or five products which have the least distance within the embedding space between their own vector representations and the query vector representation). When those query results are presented, the user can then provide feedback on the query results. The feedback signals can be, for example, positive and negative signals from user(s). That feedback can then be used by the system to generate better query results in the future, both for the user and for other users who generate the same query or similar queries.

The feedback can be positive or negative feedback. For example, if the user affirmatively selects one of the query results (i.e., a selected product) as a correct response to the query, a positive reinforcement signal can be generated, boosting the similarity score by a multiplicative scaling factor greater than 1.0 for the selected product and its neighbors in the product embedding space. Preferably, the boosting factor for the neighbors scales down in proportion to the neighbor's distance from the selected product. Likewise, if the user reacts negatively to the query results (i.e., the user does not select any of the presented query results), a negative reinforcement signal can be generated, de-boosting the similarity scores by a multiplicative scaling factor of less than 1.0 for all products in the search results list. When the same query is made in the future, the boosted feedback from the previous query will be used to update/change the similarity scores, such that the system presents products which have been boosted (and thus have a higher similarity score), and minimize the presented products which have been de-boosted (and thus have a lower similarity score).

Because the feedback provided by the users is query-specific (i.e., it only applies to the specific results provided by a specific query, rather than similar queries), the positive/negative feedback is not used by the system to modify the word embedding space or the stored vector representations of the products represented in the embedding space. Instead, when the system receives the same query again generates future query-results using the previously stored feedback, the system can (1) identify query results using a distance from the query vector representation, and (2) apply the feedback (positive or negative) to those query results, resulting in an updated list of top query results. When a new query is made, the system can store the feedback for the associated query results separately from the feedback of previous queries.

In some configurations, the system can collect feedback which is provided by a specific user, or a specific group of users. For example, such systems can allow the tailoring of search results in a manner which is specific to a given user or group of users, such that a user "Josh" could receive Josh-specific search results based on Josh's characteristics (age, job title, etc.) and/or Josh's previous feedback. Likewise, a certain group of users, such as engineers, may enter a search query expecting a particular type of result (and provide corresponding feedback), while a different group of users, such as marketing specialists, may enter the same query expecting a different type of result (and provide corresponding feedback). To differentiate between the types of feedback and provide each group customized search results tailored to the roles of the individuals making the queries, the system can track identification information such as the job roles, titles, etc., for the individuals making the queries and providing feedback, then store feedback for a given query with that identifying information. In such configurations, when the same query is made again, and the identifying information associated with a user is similar to that of a previous user who provided feedback, the previous user's feedback can be used to generate the query-results. Likewise, in such configurations, if the same query is made again but the identifying information associated with the user is not similar to that of a previous user who provided feedback, the system would not rely on the previous user's feedback in generating the query-results.

In yet other configurations, the system can account for instances where a particular user is giving excessive negative or positive bias. In such cases, the system can eliminate those biases by identifying the particular user as an outlier, with the result being that the positive/negative reinforcement signals generated by that particular user are ignored or reduced for other users.

In some configurations, positive reinforcement can occur by boosting the similarity scores for the selected product and its neighbors in the embedding space. In such configurations, the selected product is not the only similarity score boosted. Instead, all products in its vicinity within the embedding space can be boosted to provide a better search in future when the same query is made. However, the boost factor applied to the neighbors of the selected/boosted product within the embedding space can decrease according to the distance from the selected product. In some cases, this decrease can be linear, meaning that the amount of boost is linearly proportional to the distance from the selected product increases, such that as the distance from the selected product increases the boosting factor decreases by a linear amount based on the distance of the selected product from a given neighbor until the boosting factor reaches 1.0 (because the boosting factor is a multiplicative factor, the goal is not to decrease the similarity scores of neighbors). In other cases, the decrease can be non-linear. For example, the boosting factor can decrease exponentially (e.g., an inverse square) as the distance increases until the boosting factor equals 1.0. In yet other configurations, there can be a maximum distance set by the user, such that the boosting factor does not affect similarity scores for products outside that maximum distance within the embedding space.

Negative reinforcement can operate similarly to positive reinforcement. However, instead of the multiplicative factor being greater than 1 and decreasing (e.g., linearly, or non-linearly) down to 1.0 (as is done in the positive reinforcement), negative reinforcement can de-boost the similarity scores for products in the search results list by multiplying the similarity scores of presented search results by a multiplicative scaling factor less than 1.0. For example, consider a query that produces search results A, B, and C based on their similarity scores. If the user does not select any of those search results, the system can apply a de-boost to those similarity scores, such that A, B, and C are unlikely to be presented as search results for that query in the future. In some configurations, the multiplicative scaling factor can be the same for all the search results, such that the similarity scores of A, B, and C are all scaled by a common multiplicative scaling factor. In other configurations, the multiplicative scaling factor for a de-boost can vary according to feedback provided by the user, such as the user indicating that A (while not the desired result) is closer to the desired result than B or C, such that B and C receive a larger de-boost than A.

By providing feedback, and the resulting positive/negative reinforcement, users can contribute to the system, allowing the system to refine which query results are relevant and which should be ignored in a given search. For example, it may be possible that in the in the first search the user receives some good results, but not exactly what they are looking for. Because of the reinforcement logic, where based on a selection the neighborhood around that selection is also boosted, the next time that specific query is made products within the neighborhood whose similarity score boosted are more likely to be presented, and it is reasonably possible that the exact product being search for will show up. In that case the user can select the product they were looking for, which again boosts the similarity scores within the neighborhood. This iterative process can continue indefinitely, with the search results becoming increasingly refined over time.

When product names and/or product descriptions are converted into vector representations by the embedding model and stored in the embedding space, a embedding model is performing a multi-step process. First, each word within a product description can be converted to a token (i.e., a string with an assigned/identified meaning) by a tokenizer. For example, the tokenizer can parse and analyze the terms within the product description, placing the terms into predefined categories such as "keyword," "operator," "literal," "separator," etc. If the product description has ten words, there are ten tokens for those words, with each token identifying the respective word as a "keyword."

Once the tokens are generated, the system converts those tokens into the vector representation using a vectorizer. The vectorizer will take the token and convert it into a multi-dimensional vector for that given token. The different dimensions created can vary based on the word embedding model used. After each token associated with a product/product description is converted to a multi-dimensional vector, an aggregator can take each word's vector and aggregate them together (i.e., add them together), such that all the tokens associated with that product (i.e., that product's name, description, etc.) are added together, resulting in the final embedding (vector representation) for that product.

When a query is made, the system uses the same process to generate the query vector representation. For example, the query will be provided to a tokenizer, which will produce tokens on the words, operations, separators, etc., within the query, then convert those tokens into vectors, and aggregate the vectors together, resulting in the query vector representation.

With respect to federated learning concepts, consider the case where multiple users are using the reinforcement learning to improve the search results for a single common query. The system saves the feedback each user provides with respect to the presented query results, resulting in saved query-results and feedback pairs. A user may input a query "X," which she has never put in previously, but there are quite a few other users that have already used that query X. The search results for the user will be a federated search output, such that the search results are based on the feedback the other users had already provided for that query.

The application next turns to the specific examples provided in the illustrations.

FIG. 1 illustrates an example architecture for a query search pipeline. This figure shows the overall architecture of a query search pipeline at the user level, where previous feedback has already been provided for the query 104. As illustrated, a user 102 inputs the query 104, a search engine 106 identifies the best search results 108 at the time. The system uses the search results 108 with the previously recorded feedback 110 signal to identify product embeddings 112 which are which will satisfy the query 104. The system can also perform a neighborhood search 114 for related products/product embeddings 112 (e.g., the neighbors of the query's vector representation within an embedding space), and can adjust the neighbor's similarity scores 116 (i.e., Gaussian scaling 118) based on the feedback 110 signal. This revised query-results combination 120 can then be presented to the user 102 as the results of the search engine 106.

Figure 2:
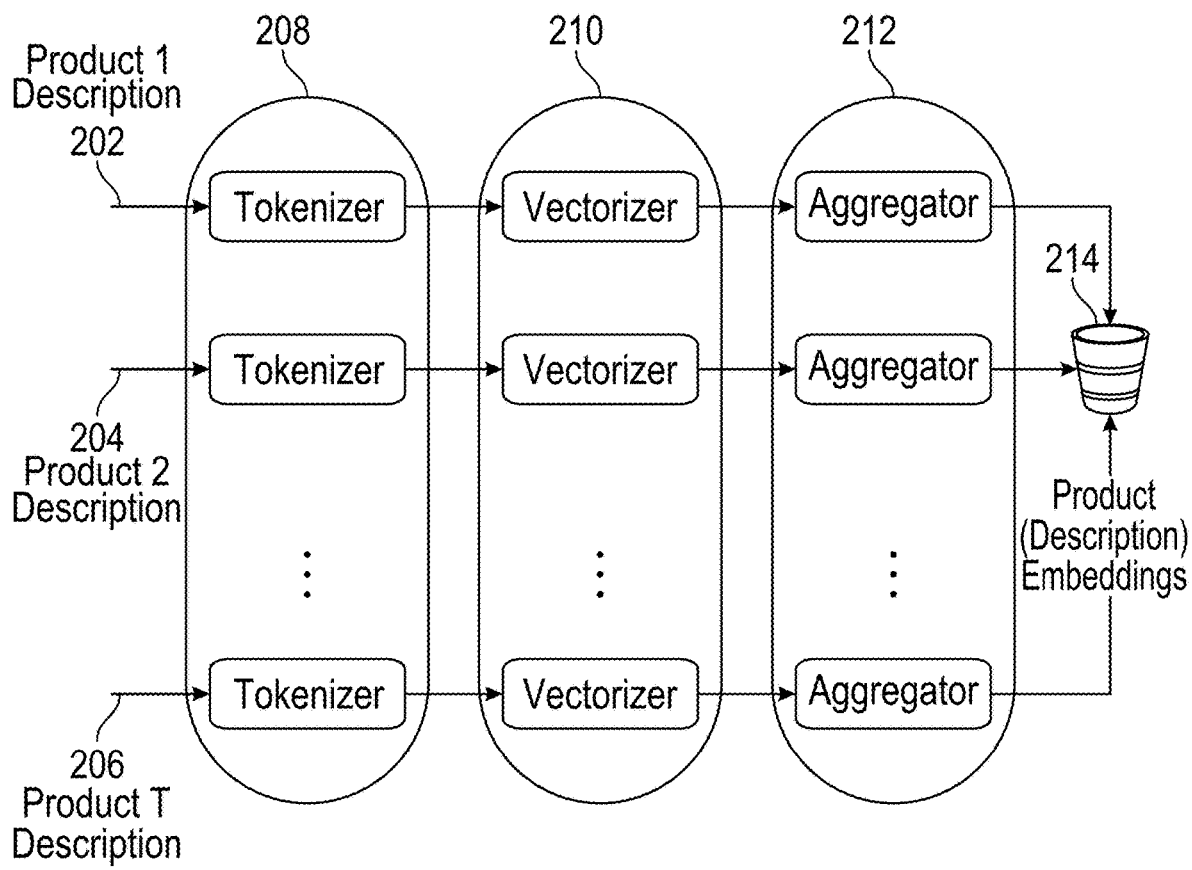
FIG. 2 illustrates an example embedding process of product descriptions which are stored as multidimensional vector space data within a database.

*FIG. 2 illustrates an example embedding process of product descriptions 202, 204, 206 which are stored as multidimensional vector space data within a database 214. As illustrated, product descriptions 202, 204, 206 are converted into product (description) embeddings (i.e., vector representations) using natural language processing techniques. A non-limiting example such natural language processing techniques is WORD2VEC. Product descriptions 202, 204, 206 are tokenized by a tokenizer 208 and the resulting tokens are vectorized. The resulting vectors are aggregated in an n-dimensional vector space, resulting in the vector representations (embeddings) for each product. The resulting product embeddings are saved in the database 214 for their subsequent use.

The tokenizer 208: In this step, the input product descriptions 202, 204, 206 are processed through the following exemplary steps:
  a. Standard domain-specific abbreviations are expanded—based on the acronyms list provided by domain experts;
  b. Product descriptions are converted to lowercase and punctuations are removed; and
  c. Input product descriptions 202, 204, 206 are tokenized into its constituent words.

The vectorizer 210: Each individual token from tokenizer 208 is converted to its vector representation based on the trained word embedding model. First, a custom domain-specific word-to-vector (such as WORD2VEC) embedding model representing vocabulary pertaining to specific products or products is trained. For example, if the specific products were electronic parts or products, the training vocabulary could consist of more than 100K unique words derived from product catalog data, including product descriptions and attributes. In such an example, the custom word-to-vector model can have the following specifications:
  a. Training algorithm: Continuous Bag of Words (CBOW) (which predicts a current word based on the context of surrounding words) with negative sampling
  b. Embedding dimensions: 120 (i.e., the resulting vector representations of given products would have 120 dimensions). This can vary based on the embedding model used.

The word vector aggregator 212: The word vector aggregator 212 performs the adding (or, in other configurations, averaging) over all word embeddings within a single product description and outputs a single product embedding (vector representation) with the same number of embedding dimensions.

Figure 3:
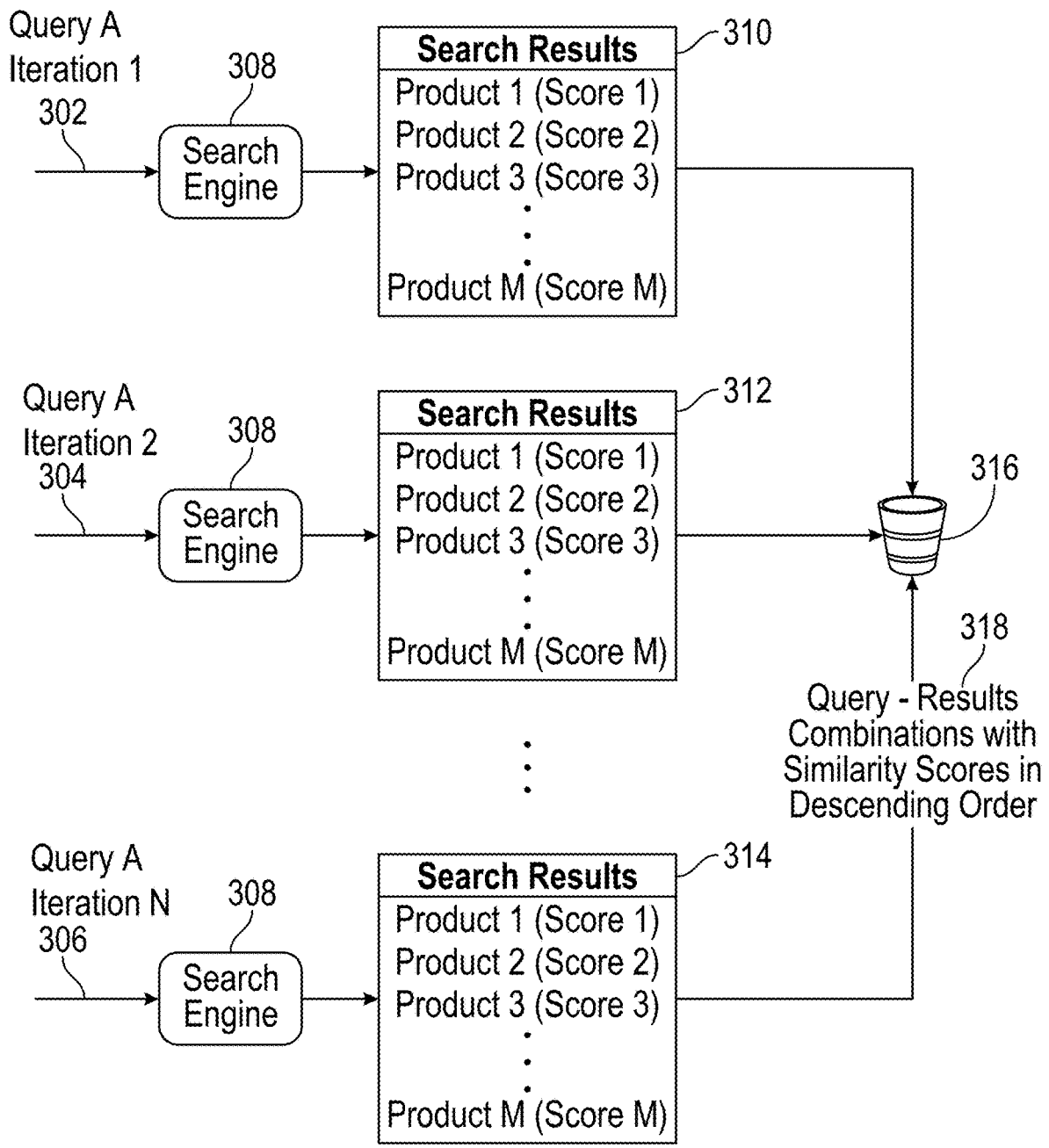
FIG. 3 illustrates an example of sample search results for different queries.

FIG. 3 illustrates an example of search results 310, 312, 314 for a single query (Query A) executed three times: iteration 1 302, iteration 2 304, and iteration 3 306. In this example, each time the query (Query A) is executed 302, 304, 306, the query is entered into a search engine 308, and the search results 310, 312, 314 are generated based on their similarity scores, with the "Product 1" of each search result 310, 312, 314 having the highest similarity score. While three example iterations of the query 302, 304, 306 and associated search results 310, 312, 314 are illustrated, any number of iterations of the query can be entered, such that a number "N" iterations of the query would produce N search results, each with similarity scores of the searched products or products in their descending order. All these query-results combinations 318 can be saved in the database 316 for further analysis.

Figure 4:
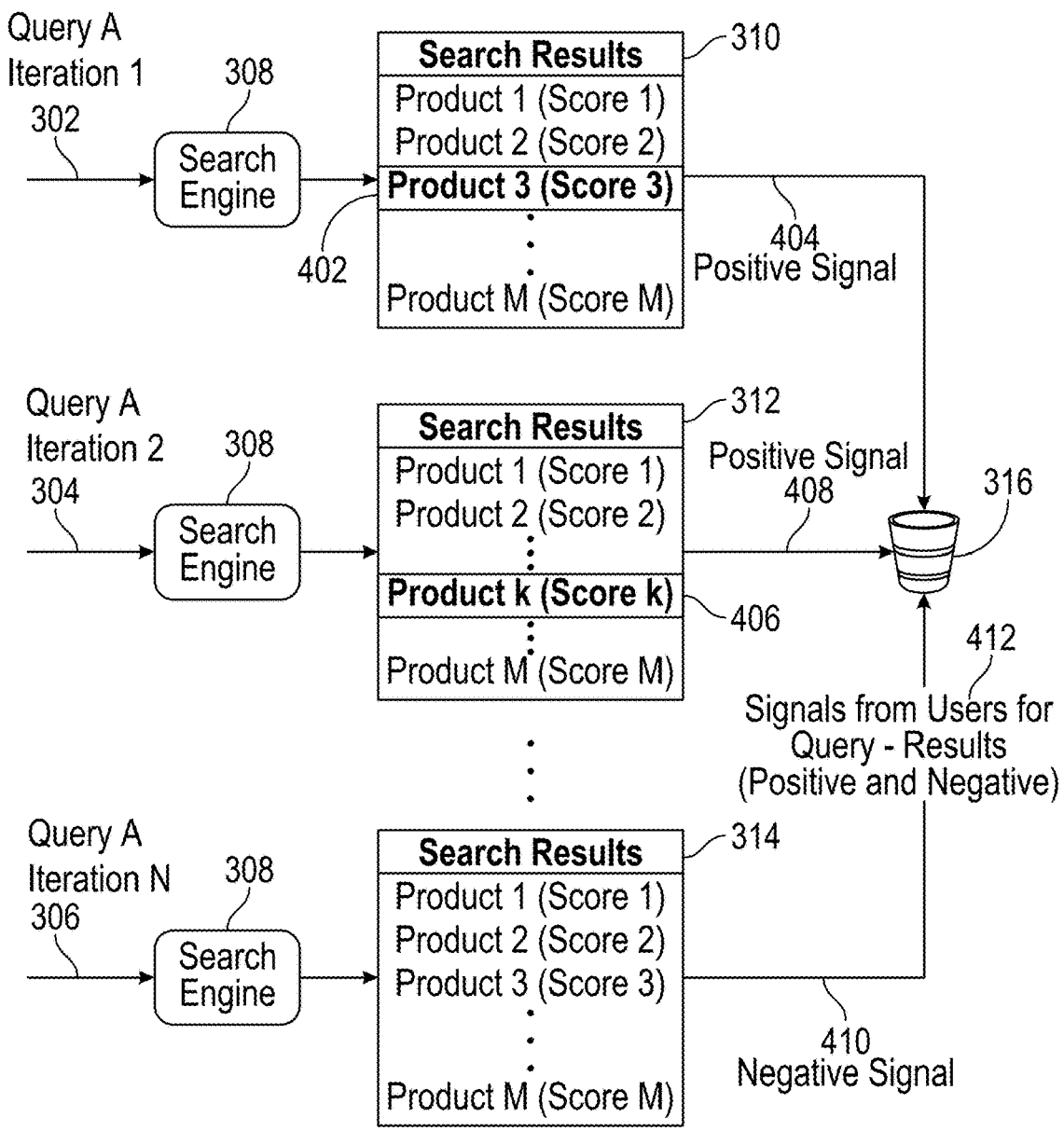
FIG. 4 illustrates an example of positive and negative signals being generated based on user responses to the search results.

FIG. 4 illustrates an example of positive feedback signals 404, 408 and a negative feedback signal 410 being generated based on user responses to the search results 310, 312, 314. FIG. 4 continues the example illustrated in FIG. 3, with the user(s) having reviewed the search results 310, 312, 314 provided by the system in response to the example queries 302, 304, 306. For the first iteration of query A 302, the user has selected Product Three 402, resulting in a positive feedback signal 404. For the second iteration of query A 304, the user has selected Product k 406, again resulting in a positive signal 408. For the Nth iteration of query A 306, the user has selected none of the presented search results 314, such that a negative signal 410 is generated. These feedback signals 404, 408, 410 are aggregated together, resulting in signals from users for query-results 412, which are recorded and saved in the database 316 for future re-ranking of search results based on the boosting or de-boosting of similarity scores through reinforcement learning using the positive feedback signals 404, 408 or negative feedback signal 410, respectively.

Figure 5:
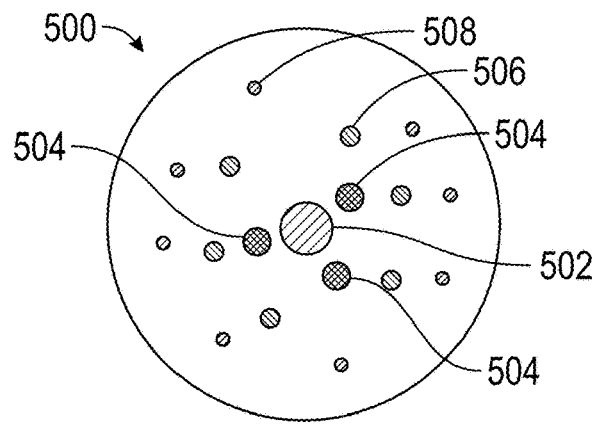
FIG. 5 illustrates an example of scaling relationships within a n-dimensional embedding space.

FIG. 5 illustrates an example of scaling relationships within a n-dimensional embedding space as similarity scores for positive feedback and negative feedback results in boosted and de-boosted similarity scores. As described above, a positive feedback signal can boost similarity scores a selected product and its neighbors by multiplicative scaling factor (i.e., greater than 1.0), with the selected result getting the biggest boost. On the other hand, scores of all negative results will be de-boosted with multiplicative scaling factor (i.e., less than 1.0).

As illustrated, the center dot represents a point (in a n-dimensional embedding space 500) corresponding to the selected result 502 by the user, while dots 504, 506, 508 around the center dot (the selected result) 502 represents neighboring products within the hypersphere of a selected radius (i.e., the neighborhood around the selected result 502). Sizes of the dots 504, 506, 508 indicate how the similarity score for user-selected result (along with its neighbors) are scaled up for improved search in future iterations. The size of the dots in this example illustrate their similarity, such that dots 504 are most similar (i.e., have a smallest distance) from the selected result 502, such that they will receive the largest boost. Dots 506 are the next closest (and have the next highest boost), and 508 are the furthest away points within the this example. Note that the multiplicative scaling factor drops off for the neighbors in proportion to their distance from the selected result 502.

Figure 6:
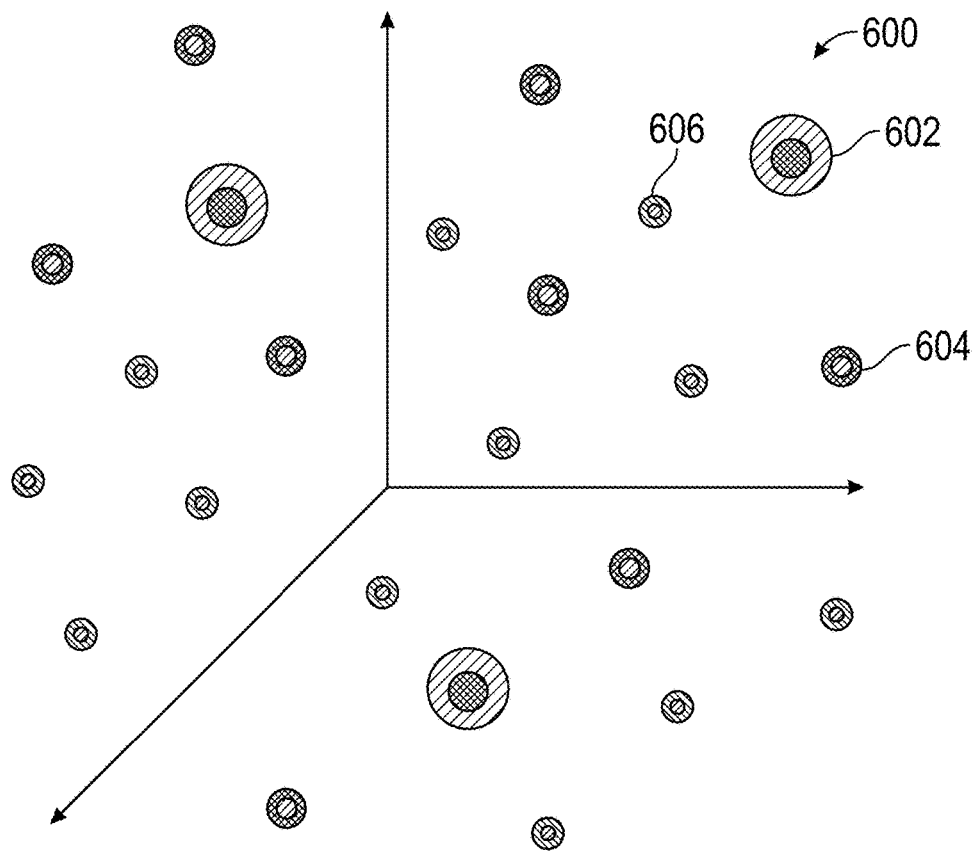
FIG. 6 illustrates an example of modifying similarity scores within a n-dimensional embedding space.

FIG. 6 illustrates an example of modifying similarity scores within a n-dimensional embedding space 600. In this example there are only 3 dimensions illustrated, while in practice the n-dimensional embedding space 600 could have hundreds of dimensions. Each dot represents a point within the n-dimensional embedding hyperspace corresponding to a product in the list of search results. Each pair of concentric circles indicates how the corresponding similarity scores are scaled down for a potentially improved search in a subsequent iteration. For example, if a product 602 is selected, that similarity score can be increased significantly (represented by the much larger circle around 602) while similar products (as determined by distance from the selected product 602) within the n-dimensional embedding hyperspace 600 can have their similarity scores boosted based on their distance from the selected product 602. As illustrated, both product A 606 and product B 604 can have their similarity scores boosted.

Similarity scores of these products can be updated based on the positive and negative feedback using the following equation:

$s = \alpha s$, where =

$$\begin{cases} \alpha = \alpha_1 \text{ for the selected product (from a positive signal)} \\ \alpha = \alpha_1 f(x, y, \ldots) \text{ from neighbor product to the selected product} \\ \alpha = \alpha_2 \text{ if a negative signal is received} \end{cases}$$

where s is the similarity score; $\alpha$ is the multiplicative factor; $\alpha_1$ is the multiplicative factor at the selected product in a positive signal/feedback case (where $\alpha_1 > 1.0$); $f(x, y, \ldots)$ is any scaling function (e.g., a Gaussian distribution that has a normalized maximum value of 1.0 at the center with its value reducing to 0.0 away from the center, a linear function, a non-linear function, etc.) which is used to describe the multiplicative factor $\alpha$ decreasing in value when moving away from the selected product; and $\alpha_2$ represents the negative feedback multiplicative factor applied to similarity scores when negative feedback is received, where $0 < \alpha_2 < 1.0$.

Figure 7:
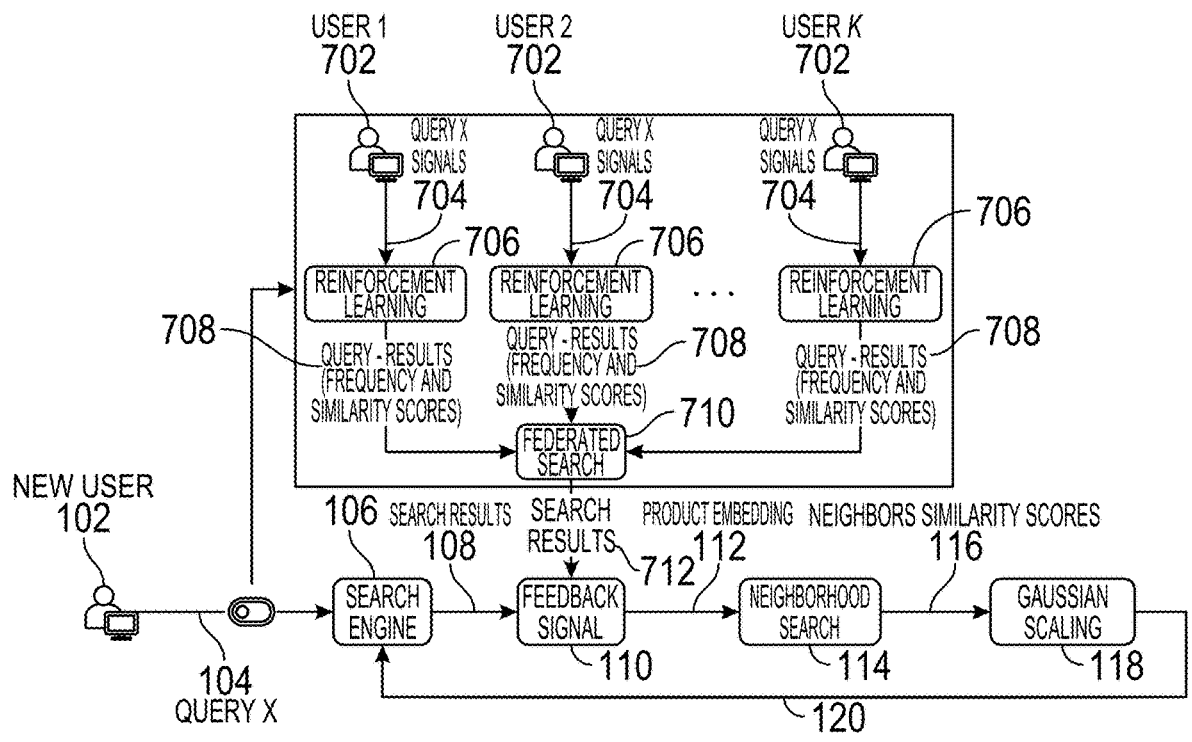
FIG. 7 illustrates an example architecture for a query search pipeline with federated learning.

FIG. 7 illustrates an example architecture for a query search pipeline with federated learning. As illustrated, a user 102 making a query "X" 104 is provided the reinforced query-results combinations 708 from different users 702 who have previously made that same query X 704. The feedback from the other users 702 has resulted in reinforcement learning 706 processes described herein, where the query-results combinations 708 can be used by the system to tailor/refine search results, resulting in federated averaging 710 of the results. More specifically, the query-results combinations 708 and associated feedback (along with information such as, but not limited to, search frequency of that query and the corresponding similarity scores) from different users 702 can be federated averaged (e.g., weighted, or otherwise combined) to create the query-results 712 for the user 102. The system can also use any feedback 110 the user 102 has previously provided for this query 104. This feedback 110 can then proceed as described above, with the federated search query-results 712 being combined with any feedback 110 of the user. At that point, the neighborhood search 114 and gaussian scaling 118 can occur as described above with respect to FIG. 1.

Federated averaging 710 of the reinforced search results can take into account factors such as (but not limited to):
- the total number of users (K) that have searched for the query in consideration;
- the total number of times (M) all users have used that query;
- the number of times the $k^{th}$ user has searched that query; and
- the similarity score for the $m^{th}$ product matched with the query by the $k^{th}$ user.

The federated averaging can, as part of the federated averaging algorithm:
- use a logarithm to sampling bias introduced by any user(s);
- tune the logarithm base with hyper-parameter tuning; and
- use a softmax function (a function that turns a vector of K real values into a vector of K real values that sum to 1) to convert the log value back into a probability distribution, where the final federated average S of the similarity scores for the $m^{th}$ product across all K users.

Figure 8:
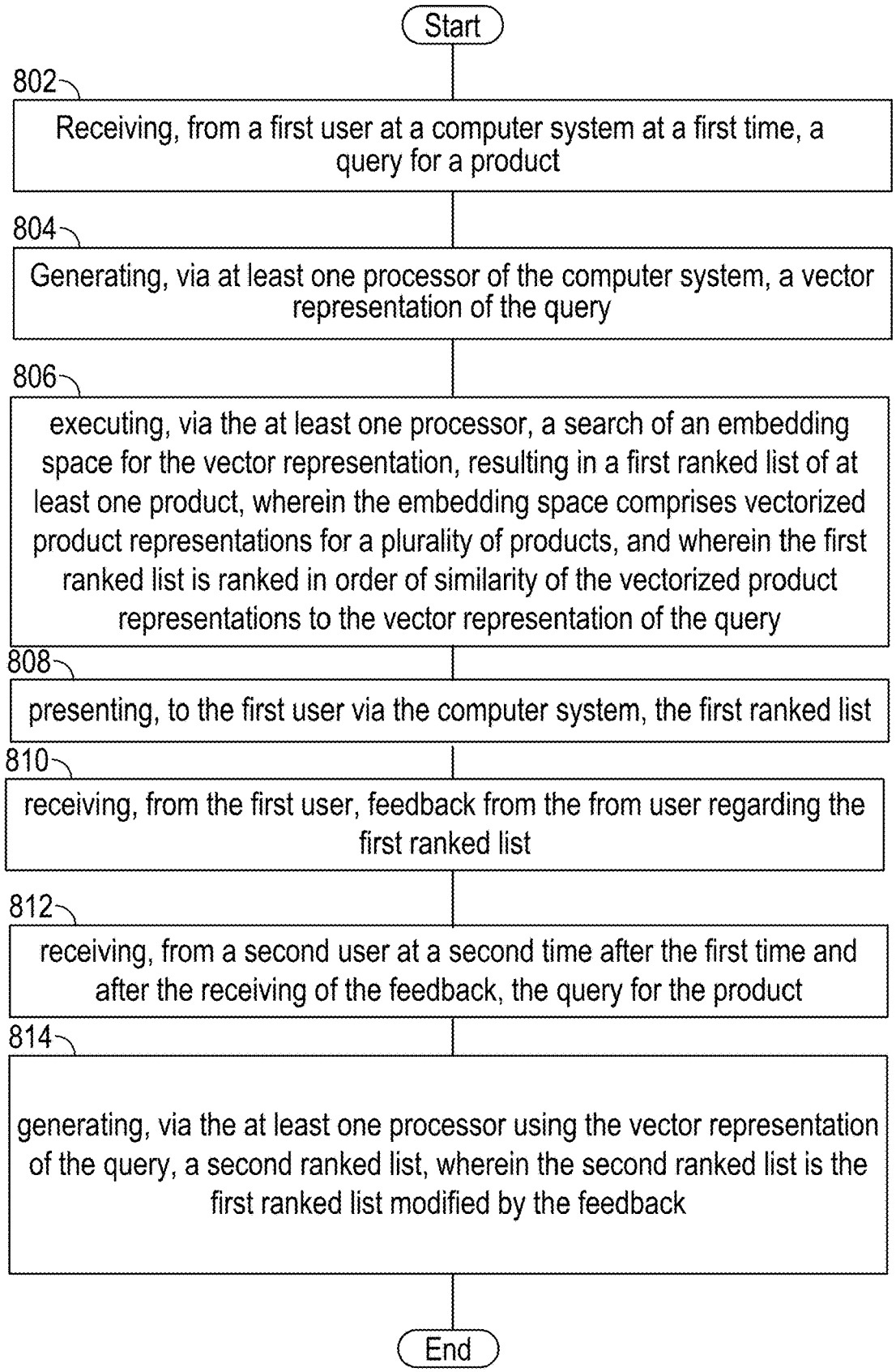
FIG. 8 illustrates an example method embodiment.

FIG. 8 illustrates an example method embodiment. As illustrated, the method can include receiving, from a user at a computer system at a first time, a query for a product (802), and generating, via at least one processor of the computer system, a vector representation of the query (804). The method can then include executing, via the at least one processor, a search of an embedding space for the vector representation, resulting in a first ranked list of at least one product, wherein the embedding space comprises vectorized product representations for a plurality of products, and wherein the first ranked list is ranked in order of similarity of the vectorized product representations to the vector representation of the query (806) and presenting, to the user via the computer system, the first ranked list (808). Next, the method can include receiving, from the user, feedback from the user regarding the first ranked list (810) and receiving, from the user at a second time after the first time and after the receiving of the feedback, the query for the product (812). The method can then include generating, via the at least one processor using the vector representation of the query, a second ranked list, wherein the second ranked list is the first ranked list modified by the feedback (814).

In some configurations, the generating of the vector representation can further include: generating, via the at least one processor based on the query, a token; and converting, via the at least one processor using an embedding model, the token into the vector representation.

In some configurations, the illustrated method can further include: updating, via the at least one processor based on the feedback, similarity scores of the plurality of products to the vector representation of the query, resulting in updated similarity scores, wherein the updated similarity scores are used to identify top ranked products for the second ranked list. In such configurations, wherein the top ranked products comprise a predetermined number of products with similarity scores higher than remaining products within the embedding space. In addition, the updating of the similarity scores comprises multiplying a similarity score of each product by a factor, wherein each product within the plurality of products has a corresponding factor within a plurality of factors, resulting in the updated similarity scores. Each factor in the plurality of factors has a reduction in magnitude according to a distance of each product from a selected product within the embedding space. The distance of each product in the other products from the selected product within the embedding space can be one of a cosine distance and a Euclidean distance.

In some configurations, the generating of the second ranked list further comprises modifying the first ranked list based on a time duration between the first time and the second time.

In some configurations, the at least one search result is further based on a federated average of query-result combinations from a plurality of other users.

Figure 9:
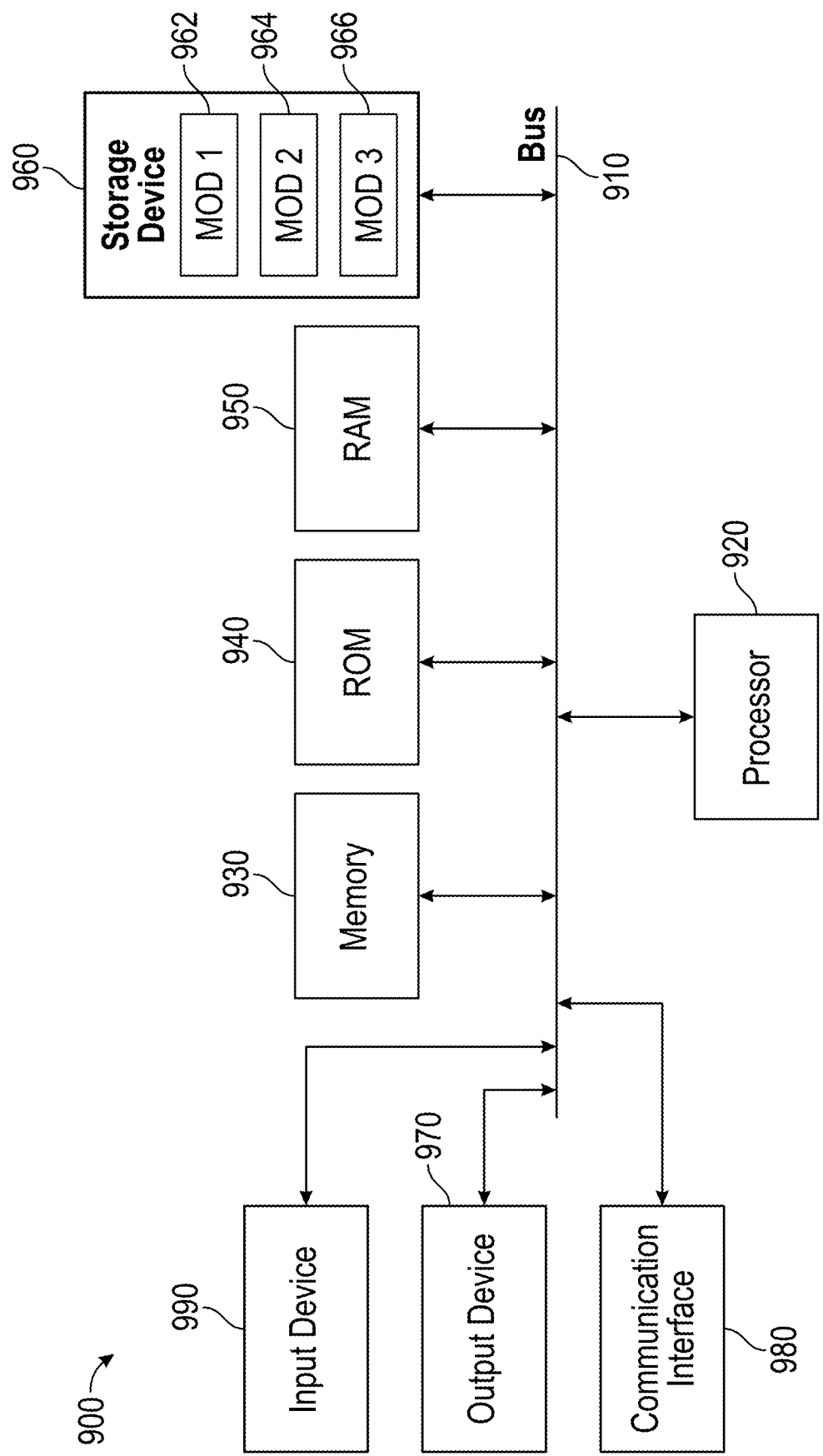
FIG. 9 illustrates an example computer system.

With reference to FIG. 9, an exemplary system includes a general-purpose computing device 900, including a processing unit (CPU or processor) 920 and a system bus 910 that couples various system components including the system memory 930 such as read-only memory (ROM) 940 and random-access memory (RAM) 950 to the processor 920. The computing device 900 can include a cache of high-speed memory connected directly with, in close proximity to, or integrated as part of the processor 920. The computing device 900 copies data from the system memory 930 and/or the storage device 960 to the cache for quick access by the processor 920. In this way, the cache provides a performance boost that avoids processor 920 delays while waiting for data. These and other modules can control or be configured to control the processor 920 to perform various actions. Other system memory 930 may be available for use as well. The system memory 930 can include multiple different types of memory with different performance characteristics. It can be appreciated that the disclosure may operate on a computing device 900 with more than one processor 920 or on a group or cluster of computing devices networked together to provide greater processing capability. The processor 920 can include any general-purpose processor and a hardware module or software module, such as module 1 962, module 2 964, and module 3 966 stored in storage device 960, configured to control the processor 920 as well as a special-purpose processor where software instructions are incorporated into the actual processor design. The processor 920 may essentially be a completely self-contained computing system, containing multiple cores or processors, a bus, memory controller, cache, etc. A multi-core processor may be symmetric or asymmetric.

The system bus 910 may be any of several types of bus structures including a memory bus or memory controller, a peripheral bus, and a local bus using any of a variety of bus architectures. A basic input/output (BIOS) stored in read-only memory (ROM) 940 or the like, may provide the basic routine that helps to transfer information between elements within the computing device 900, such as during start-up. The computing device 900 further includes storage devices 960 such as a hard disk drive, a magnetic disk drive, an optical disk drive, tape drive or the like. The storage device 960 can include software modules 962, 964, 966 for controlling the processor 920. Other hardware or software modules are contemplated. The storage device 960 is connected to the system bus 910 by a drive interface. The drives and the associated computer-readable storage media provide nonvolatile storage of computer-readable instructions, data structures, program modules and other data for the computing device 900. In one aspect, a hardware module that performs a particular function includes the software component stored in a tangible computer-readable storage medium in connection with the necessary hardware components, such as the processor 920, system bus 910, output device 970, and so forth, to carry out the function. In another aspect, the system can use a processor and computer-readable storage medium to store instructions which, when executed by a processor (e.g., one or more processors), cause the processor to perform a method or other specific actions. The basic components and appropriate variations are contemplated depending on the type of device, such as whether the computing device 900 is a small, handheld computing device, a desktop computer, or a computer server.

Although the exemplary embodiment described herein employs the hard disk 960, other types of computer-readable media which can store data that are accessible by a computer, such as magnetic cassettes, flash memory cards, digital versatile disks, cartridges, random-access memories (RAMs) 950, and read-only memory (ROM) 940, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 900, an input device 990 represents any number of input mechanisms, such as a microphone for speech, a touch-sensitive screen for gesture or graphical input, keyboard, mouse, motion input, speech and so forth. An output device 970 can also be one or more of a number of output mechanisms known to those of skill in the art. In some instances, multimodal systems enable a user to provide multiple types of input to communicate with the computing device 900. The communications interface 980 generally governs and manages the user input and system output. There is no restriction on operating on any particular hardware arrangement and therefore the basic features here may easily be substituted for improved hardware or firmware arrangements as they are developed.

The technology discussed herein refers to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. For example, unless otherwise explicitly indicated, the steps of a process or method may be performed in an order other than the example embodiments discussed above. Likewise, unless otherwise indicated, various components may be omitted, substituted, or arranged in a configuration other than the example embodiments discussed above.

Further aspects of the present disclosure are provided by the subject matter of the following clauses.

A method comprising: receiving, from a user at a computer system at a first time, a query for a product; generating, via at least one processor of the computer system, a vector representation of the query; executing, via the at least one processor, a search of an embedding space for the vector representation, resulting in a first ranked list of at least one product, wherein the embedding space comprises vectorized product representations for a plurality of products, and wherein the first ranked list is ranked in order of similarity of the vectorized product representations to the vector representation of the query; presenting, to the user via the computer system, the first ranked list; receiving, from the user, feedback from the user regarding the first ranked list; receiving, from the user at a second time after the first time and after the receiving of the feedback, the query for the product; generating, via the at least one processor using the vector representation of the query, a second ranked list, wherein the second ranked list is the first ranked list modified by the feedback.

The method of any preceding clause, wherein the generating of the vector representation further comprises: generating, via the at least one processor based on the query, a token; and converting, via the at least one processor using an embedding model, the token into the vector representation.

The method of any preceding clause, wherein the generating of the second ranked list comprises: updating, via the at least one processor based on the feedback, similarity scores of the plurality of products to the vector representation of the query, resulting in updated similarity scores, wherein the updated similarity scores are used to identify top ranked products for the second ranked list.

The method of any preceding clause, wherein the top ranked products comprise a predetermined number of products with similarity scores higher than remaining products within the embedding space.

The method of any preceding clause, wherein: the updating of the similarity scores comprises multiplying a similarity score of each product by a factor, wherein each product within the plurality of products has a corresponding factor within a plurality of factors, resulting in the updated similarity scores.

The method of any preceding clause, wherein each factor in the plurality of factors has a reduction in magnitude according to a distance of each product from a selected product within the embedding space.

The method of any preceding clause, wherein the distance of each product from the selected product within the embedding space is one of a cosine distance and a Euclidean distance.

The method of any preceding clause, wherein the generating of the second ranked list further comprises modifying the first ranked list based on a time duration between the first time and the second time.

A system comprising: at least one processor; and a non-transitory computer-readable storage medium having instructions stored which, when executed by the at least one processor, cause the at least one processor to perform operations comprising: receiving, from a user at a first time, a query for a product; generating a vector representation of the query; executing a search of an embedding space for the vector representation, resulting in a first ranked list of at least one product, wherein the embedding space comprises vectorized product representations for a plurality of products, and wherein the first ranked list is ranked in order of similarity of the vectorized product representations to the vector representation of the query; presenting, to the user, the first ranked list; receiving, from the user, feedback from the user regarding the first ranked list; receiving, from the user at a second time after the first time and after the receiving of the feedback, the query for the product; generating, using the vector representation of the query, a second ranked list, wherein the second ranked list is the first ranked list modified by the feedback.

The system of any preceding clause, wherein the generating of the vector representation further comprises: generating, based on the query, a token; and converting, using an embedding model, the token into the vector representation.

The system of any preceding clause, wherein the generating of the second ranked list comprises: updating, based on the feedback, similarity scores of the plurality of products to the vector representation of the query, resulting in updated similarity scores, wherein the updated similarity scores are used to identify top ranked products for the second ranked list.

The system of any preceding clause, wherein the top ranked products comprise a predetermined number of products with similarity scores higher than remaining products within the embedding space.

The system of any preceding clause, wherein: the updating of the similarity scores comprises multiplying a similarity score of each product by a factor, wherein each product within the plurality of products has a corresponding factor within a plurality of factors, resulting in the updated similarity scores.

The system of any preceding clause, wherein each factor in the plurality of factors has a reduction in magnitude according to a distance of each product from a selected product within the embedding space.

The system of any preceding clause, wherein the distance of each product from the selected product within the embedding space is one of a cosine distance and a Euclidean distance.

The system of any preceding clause, wherein the generating of the second ranked list further comprises modifying the first ranked list based on a time duration between the first time and the second time.

A non-transitory computer-readable storage medium having instructions stored which, when executed by at least one processor, cause the at least one processor to perform operations comprising: receiving, from a user at a first time, a query for a product; generating a vector representation of the query; executing a search of an embedding space for the vector representation, resulting in a first ranked list of at least one product, wherein the embedding space comprises vectorized product representations for a plurality of products, and wherein the first ranked list is ranked in order of similarity of the vectorized product representations to the vector representation of the query; presenting, to the user, the first ranked list; receiving, from the user, feedback from the user regarding the first ranked list; receiving, from the user at a second time after the first time and after the receiving of the feedback, the query for the product; generating, using the vector representation of the query, a second ranked list, wherein the second ranked list is the first ranked list modified by the feedback.

The non-transitory computer-readable storage medium of any preceding clause, wherein the generating of the vector representation further comprises: generating, based on the query, a token; and converting, using an embedding model, the token into the vector representation.

The non-transitory computer-readable storage medium of any preceding clause, wherein the generating of the second ranked list comprises: updating, based on the feedback, similarity scores of the plurality of products to the vector representation of the query, resulting in updated similarity scores, wherein the updated similarity scores are used to identify top ranked products for the second ranked list.

The non-transitory computer-readable storage medium of any preceding clause, wherein the top ranked products comprise a predetermined number of products with similarity scores higher than remaining products within the embedding space.

A method comprising: receiving, from a plurality of first users at a computer system, a query for a product; generating, via at least one processor of the computer system, a vector representation of the query; executing, via the at least one processor, a search of an embedding space for the vector representation, resulting in a first ranked list of at least one product, wherein the embedding space comprises vectorized product representations for a plurality of products, and wherein the first ranked list is ranked in order of similarity of the vectorized product representations to the vector representation of the query; presenting, to the plurality of first users via the computer system, the first ranked list; receiving, from the plurality of first users, feedback from the plurality of first users regarding the first ranked list, wherein the feedback is received in parallel; receiving, from a second user after the receiving of the feedback, the query for the product; generating, via the at least one processor using the vector representation of the query, a second ranked list, wherein the second ranked list is the first ranked list modified by the feedback of the plurality of first users.

The method of any preceding clause, wherein the generating of the vector representation further comprises: generating, via the at least one processor based on the query, a token; and converting, via the at least one processor using an embedding model, the token into the vector representation.

The method of any preceding clause, wherein the generating of the second ranked list comprises: updating, via the at least one processor based on the feedback, similarity scores of the plurality of products to the vector representation of the query, resulting in updated similarity scores, wherein the updated similarity scores are used to identify top ranked products for the second ranked list.

The method of any preceding clause, wherein the top ranked products comprise a predetermined number of products with similarity scores higher than remaining products within the embedding space.

The method of any preceding clause, wherein: the updating of the similarity scores comprises multiplying a similarity score of each product by a factor, wherein each product within the plurality of products has a corresponding factor within a plurality of factors, resulting in the updated similarity scores.

The method of any preceding clause, wherein each factor in the plurality of factors has a reduction in magnitude according to a distance of each product from a selected product within the embedding space.

The method of any preceding clause, wherein the distance of each product from the selected product within the embedding space is one of a cosine distance and a Euclidean distance.

The method of any preceding clause, wherein the generating of the second ranked list further comprises modifying the first ranked list based on a time duration between the receiving of the feedback and the receiving of the query from the second user.

The method of any preceding clause, wherein the generating of the second ranked list further comprises modifying the first ranked list based on at least one of: a total number of users (K) within the plurality of first users that have searched for the query; a total number of times (M) all users have searched for the query; a total number of times the second user has searched the query; and a similarity score for a product selected for the query by another user.

A system comprising: at least one processor; and a non-transitory computer-readable storage medium having instructions stored which, when executed by the at least one processor, cause the at least one processor to perform operations comprising: receiving, from a plurality of first users, a query for a product; generating a vector representation of the query; executing a search of an embedding space for the vector representation, resulting in a first ranked list of at least one product, wherein the embedding space comprises vectorized product representations for a plurality of products, and wherein the first ranked list is ranked in order of similarity of the vectorized product representations to the vector representation of the query; presenting, to the plurality of first users, the first ranked list; receiving, from the plurality of first users, feedback from the first user regarding the first ranked list, wherein the feedback is received in parallel; receiving, from a second user after the receiving of the feedback, the query for the product; generating, using the vector representation of the query, a second ranked list, wherein the second ranked list is the first ranked list modified by the feedback.

The system of any preceding clause, wherein the generating of the vector representation further comprises: generating, based on the query, a token; and converting, using an embedding model, the token into the vector representation.

The system of any preceding clause, wherein the generating of the second ranked list comprises: updating, based on the feedback, similarity scores of the plurality of products to the vector representation of the query, resulting in updated similarity scores, wherein the updated similarity scores are used to identify top ranked products for the second ranked list.

The system of any preceding clause, wherein the top ranked products comprise a predetermined number of products with similarity scores higher than remaining products within the embedding space.

The system of any preceding clause, wherein: the updating of the similarity scores comprises multiplying a similarity score of each product by a factor, wherein each product within the plurality of products has a corresponding factor within a plurality of factors, resulting in the updated similarity scores.

The system of any preceding clause, wherein each factor in the plurality of factors has a reduction in magnitude according to a distance of each product from a selected product within the embedding space.

The system of any preceding clause, wherein the distance of each product from the selected product within the embedding space is one of a cosine distance and a Euclidean distance.

The system of any preceding clause, wherein the generating of the second ranked list further comprises modifying the first ranked list based on a time duration between the receiving of the feedback and the receiving of the query from the second user.

The system of any preceding clause, wherein the generating of the second ranked list further comprises modifying the first ranked list based on at least one of: a total number of users (K) within the plurality of first users that have searched for the query; a total number of times (M) all users have searched for the query; a total number of times the second user has searched the query; and a similarity score for a product selected for the query by another user.

A non-transitory computer-readable storage medium having instructions stored which, when executed by at least one processor, cause the at least one processor to perform operations comprising: receiving, from a first user at a first time, a query for a product; generating a vector representation of the query; executing a search of an embedding space for the vector representation, resulting in a first ranked list of at least one product, wherein the embedding space comprises vectorized product representations for a plurality of products, and wherein the first ranked list is ranked in order of similarity of the vectorized product representations to the vector representation of the query; presenting, to the first user, the first ranked list; receiving, from the first user, feedback from the first user regarding the first ranked list;

receiving, from a second user at a second time after the first time and after the receiving of the feedback, the query for the product; generating, using the vector representation of the query, a second ranked list, wherein the second ranked list is the first ranked list modified by the feedback.

The non-transitory computer-readable storage medium of any preceding clause, wherein the generating of the vector representation further comprises: generating, based on the query, a token; and converting, using an embedding model, the token into the vector representation.

We claim:

1. A method comprising:
receiving, from a plurality of first users at a computer system, a query for a product;
generating, via at least one processor of the computer system, a vector representation of the query;
storing, by a memory of the computer system, an embedding space comprising vectorized product representations for a plurality of products:
executing, via the at least one processor, a search within the embedding space for the vector representation of the query, resulting in a first ranked list of products, wherein the first ranked list is ranked in order of distance between the vectorized product representations to the vector representation of the query within the embedding space, wherein a shorter distance between a vectorized product representation and the vector representation of the query within the embedding space corresponds to a higher ranking within the first ranked list;
presenting, to the plurality of first users via the computer system, the first ranked list of products;
receiving, from the plurality of first users, positive reinforcement signals corresponding to product selections from the first ranked list of products by the plurality of first users;
determining a federated average based on the positive reinforcement signals from the plurality of first users;
receiving, from a second user after the receiving of the positive reinforcement signals, the query for the product;
scaling at least one of the vectorized product representations of the embedding space based on the federated average, wherein scaling the at least one one of the vectorized product representations shortens its distance from the vector representation of the query within the embedding space relative to other vectorized product representations; and
presenting, by a display screen communicably coupled to the computer system, a second ranked list of products that is selectable by the second user, wherein the second ranked list that is presented is the first ranked list reordered based on the shortened distance between the at least one scaled vectorized product representation and the vector representation of the query, such that a product associated with the at least one scaled vectorized product representation is ranked higher in the second ranked list compared to the first ranked list, thereby presenting to the second user more relevant product results for the query based on the product selections of the plurality of first users.

2. The method of claim 1, wherein the generating of the vector representation of the query further comprises:
generating, via the at least one processor based on the query, a token; and
converting, via the at least one processor using an embedding model, the token into the vector representation.

3. The method of claim 1, comprising:
determining similarity scores for each of the vectorized product representations and the vector representation of the query based on the distance between the vectorized product representations to the vector representation of the query within the embedding space; and
updating the similarity scores based on the at least one scaled vectorized product representation, wherein the updated similarity scores are used to present an identification of top ranked products of the second ranked list.

4. The method of claim 3, wherein the top ranked products of the second list comprise a predetermined number of products with similarity scores higher than remaining products within the embedding space.

5. The method of claim 3, comprising determining, based on the federated average, a scaling factor for each of the at least one of the vectorized product representations that are scaled, wherein the updating of the similarity scores comprises multiplying each of the at least one of the vectorized product representation by the corresponding scaling factor.

6. The method of claim 1, wherein the distance of each of the at least one scaled vectorized product representation to the vector representation of the query within the embedding space is one of a cosine distance and a Euclidean distance.

7. The method of claim 1, wherein the federated average is determined based on a time duration between receiving the positive reinforcement signals and receiving of the query from the second user.

8. The method of claim 1, wherein the federated average is based on at least one of:
a total number of users (K) within the plurality of first users that have searched for the query;
a total number of times (M) all users have searched for the query;
a total number of times the second user has searched the query; and
a similarity score for a product selected for the query by another user.

9. A system comprising:
at least one processor; and
a non-transitory computer-readable storage medium having instructions stored which, when executed by the at least one processor, cause the at least one processor to perform operations comprising:
receiving, from a plurality of first users, a query for a product;
generating a vector representation of the query;
storing an embedding space comprising vectorized product representations for a plurality of products;
executing a search within the embedding space for the vector representation of the query, resulting in a first ranked list of products, wherein the first ranked list is ranked in order of distance between the vectorized product representations to the vector representation of the query within the embedding space, wherein a shorter distance between a vectorized product representation and the vector representation of the query within the embedding space corresponds to a higher ranking within the first ranked list;
presenting, to the plurality of first users via the computer system, the first ranked list of products;
receiving, from the plurality of first users, positive reinforcement signals corresponding to product selections from the first ranked list of products by the plurality of first users;

determining a federated average based on the positive reinforcement signals from the plurality of first users;

receiving, from a second user after the receiving of the positive reinforcement signals, the query for the product;

scaling at least one of the vectorized product representations of the embedding space based on the federated average, wherein scaling the at least one of the vectorized product representations shortens its distance from the vector representation of the query within the embedding space relative to other vectorized product representations; and presenting, via a display screen, a second ranked list of products that is selectable by the second user, wherein the second ranked list that is presented is the first ranked list reordered based on the shortened distance between the at least one scaled vectorized product representation and the vector representation of the query, such that a product associated with the at least one scaled vectorized product representation is ranked higher in the second ranked list compared to the first ranked list, thereby presenting to the second user more relevant product results for the query based on the product selections of the plurality of first users.

10. The system of claim 9, wherein the generating of the vector representation further comprises:

generating, based on the query, a token; and converting, using an embedding model, the token into the vector representation.

11. The system of claim 9, wherein the instructions, when executed by the at least one processor, cause the at least one processor to perform operations comprising:

determining similarity scores for each of the vectorized product representations and the vector representation of the query based on the distance between the vectorized product representations to the vector representation of the query within the embedding space; and updating the similarity scores based on the at least one scaled vectorized product representation, wherein the updated similarity scores are used to present an identification of top ranked products of the second ranked list.

12. The system of claim 11, wherein the top ranked products of the second list comprise a predetermined number of products with similarity scores higher than remaining products within the embedding space.

13. The system of claim 11, wherein the instructions, when executed by the at least one processor, cause the at least one processor to perform operations comprising determining, based on the federated average, a scaling factor for each of the at least one of the vectorized product representations that are scaled, wherein the updating of the similarity scores comprises multiplying each of the at least one of the vectorized product representation by the corresponding scaling factor.

14. The system of claim 1, wherein the distance of each of the at least one scaled vectorized product representation to the vector representation of the query within the embedding space is one of a cosine distance and a Euclidean distance.

15. The system of claim 9, wherein the federated average is determined based on a time duration between receiving the positive reinforcement signals and receiving of the query from the second user.

16. The system of claim 9, wherein the federated average is based on at least one of:

a total number of users (K) within the plurality of first users that have searched for the query;

a total number of times (M) all users have searched for the query;

a total number of times the second user has searched the query; and a similarity score for a product selected for the query by another user.

17. A non-transitory computer-readable storage medium having instructions stored which, when executed by at least one processor, cause the at least one processor to perform operations comprising:

receiving, from first users at first times, a query for a product;

generating a vector representation of the query;

storing an embedding space comprising vectorized product representations for a plurality of products;

executing a search within the embedding space for the vector representation of the query, resulting in a first ranked list of products, wherein the first ranked list is ranked in order of distance between the vectorized product representations to the vector representation of the query within the embedding space, wherein a shorter distance between a vectorized product representation and the vector representation of the query within the embedding space corresponds to a higher ranking within the first ranked list;

presenting, to the first users, the first ranked list of products;

receiving, from the first users, a positive reinforcement signal corresponding to product selections from the first ranked list of products by the first users;

determining a federated average based on the positive reinforcement signals from the first users;

receiving, from a second time after the first times and after the receiving of the reinforcement signals, the query for the product;

scaling at least one of the vectorized product representations of the embedding space based on the reinforcement signals, wherein scaling the at least one of the vectorized product representations shortens its distance from the vector representation of the query within the embedding space relative to other vectorized product representations; and presenting, via a display screen, a second ranked list of products that is selectable by the second user, wherein the second ranked list that is presented is the first ranked list reordered based on the shortened distance between the at least one scaled vectorized product representation and the vector representation of the query, such that a product associated with the at least one scaled vectorized product representation is ranked higher in the second ranked list compared to the first ranked list, thereby presenting to the second user more relevant product results for the query based on the product selections of the plurality of first users.

18. The non-transitory computer-readable storage medium of claim 17, wherein the query comprises words, wherein the generating of the vector representation of the query further comprises:

generating, based on the query, tokens corresponding to each of the words; and converting, using an embedding model, the tokens into the vector representation, wherein the vector representation comprises at least fifty dimensions.

\* \* \* \* \*